UNITED STATES PATENT OFFICE.

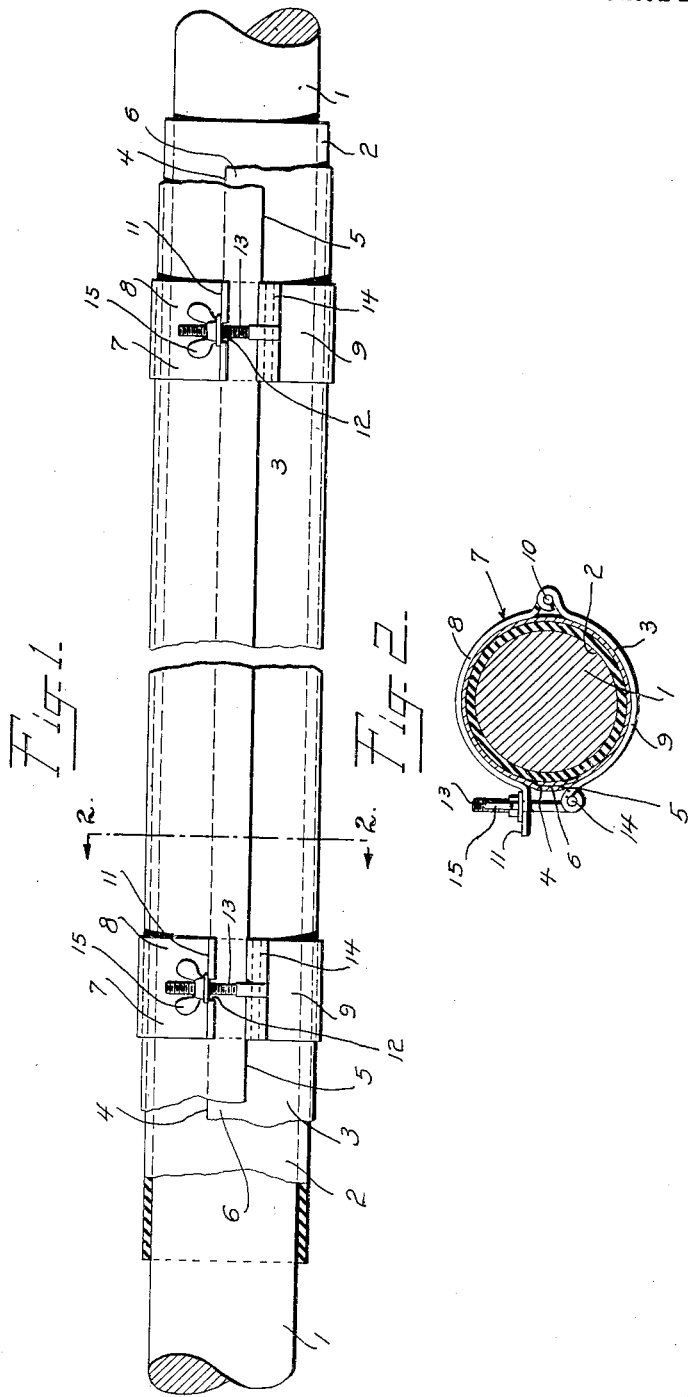

ARTHUR J. BROWN, OF UNION, NEW JERSEY, ASSIGNOR TO G & J TIRE COMPANY, A CORPORATION OF INDIANA.

VULCANIZING APPARATUS.

1,358,820.      Specification of Letters Patent.      Patented Nov. 16, 1920.

Application filed October 22, 1919. Serial No. 332,490.

*To all whom it may concern:*

Be it known that I, ARTHUR J. BROWN, a citizen of the United States, residing at Union, county of Hudson, and State of New Jersey, have invented certain new and useful Improvements in Vulcanizing Apparatus, of which the following is a full, clear, and exact description.

This invention relates to vulcanizing apparatus and is more particularly directed to an apparatus for vulcanizing hollow rubber articles and the like.

In the manufacture of certain articles such as inner tubes, hose and the like, it is common practice to wind a sheet of unvulcanized rubber several times about a mandrel, to apply then a strip of fabric of sufficient width to completely encircle the rubber so wrapped and thereupon to apply a narrow strip of fabric spirally under tension over the first applied strip. When so wrapped, the material is then subjected to vulcanization. It will be observed that the wrapping must be carefully done so that substantially uniform tension results in the wrapped mass and is consequently an exacting and time consuming step. Furthermore, the process of vulcanization usually serves to destroy the wrapping. One object of the present invention accordingly is to provide an apparatus which shall do away with the disadvantages mentioned while maintaining the advantages usually found in fabric wrappings. Another object is to provide a simple inexpensive device which may be readily applied to and removed from the article before and after vulcanization.

Broadly speaking, the invention accordingly consists of a mandrel adapted to support an article in a mold, a resilient or metallic mold of larger dimensions than the article so supported and a device for bending a wall of the mold into engagement with the article.

In the accompanying drawing, where is shown one of the various possible embodiments of the invention, Figure 1 is an elevation of the device showing a rubber tube supported by a mandrel and inclosed by the vulcanizing mold which is in engagement therewith; and Fig. 2 is a cross section of the apparatus taken on the line 2—2 of Fig. 1.

Referring now more particularly to the drawing, there is shown a cylindrical mandrel 1 which serves to support a tube of rubber or similar composition 2 which lies within the vulcanizing mold 3. The vulcanizing mold is substantially cylindrical in form and consists preferably of steel or other metallic sheet metal in the form of a roll constituting a sheathing having a thickness sufficient to provide rigidity to the walls of the mold.

The mold is adapted to be slipped over the rubber tubing 2, its diameter being adjustable to permit such slipping through its roll form which provides a slit 4 extending longitudinally throughout the length of the roll. This slit provides a portion 5 which lies superposed upon a portion 6 when the mold is brought into engagement with the rubber tubing. This engagement is provided, it will be noted, by bending the wall until it contacts with the tubing and firmly engages its underlying wall.

Bending of the wall is accomplished by means of a series of substantially cylindrical split collars 7. Each collar is identical, and a description of one will suffice for all. Each collar is made up of two similar metal arc-shaped pieces, 8 and 9, hinged together at 10. That portion of the piece 8 diametrically opposite the hinge 10 is provided with a flanged portion 11 which is provided with a notched portion 12. Into this notch is adapted to swing a bolt 13 pivoted at 14 upon the extremity of the section 9. This bolt is provided with a butterfly nut 15 adapted to contact with the upper face of the flange adjacent the notch 12. Upon rotation of this nut, the adjacent edges of the sections 8 and 9 are brought toward one another. The construction thus constitutes a pair of jaws which serve when moved together to engage the roll and decrease the diameter of the mold and when moved apart to increase the diameter. It will be observed that the clamps hold the sheet metal sheathing in position and exert a substantially uniform pressure on the plastic tube 2 and that this pressure may be varied more or less by adjustment thereof.

The provision of a metal sheath as described permits the rapid application and withdrawal of the vulcanizing mold from the material to be vulcanized, and as pointed out, the clamping members coöperating with the roll insure not only rapidity in use but also a uniform pressure throughout the surface of the rubber. The mold may be used repeatedly. It will thus be seen that the objects above enumerated among others are achieved by the embodiment of the invention set forth.

It will be obvious that various modifications of the apparatus described may be used. The shape of the mold may be such as to correspond to articles of various forms. For example, it may be in the form of a torus or sphere or other desired shape. And while it is preferred to constrict the resilient sheathing about the coating on the external mandrel as shown, it is obviously within the principles of the invention to employ the sheathing internally on a hollow mandrel, the necessary pressure upon the vulcanizable mass being exerted by the tendency of the sheathing to uncoil itself after being wound up in a small enough scroll to pass through a coating lining the hollow tubular mandrel.

As many apparently widely different embodiments of this invention may be made without departing from the spirit thereof, it will be understood that I do not intend to limit myself to the specific embodiment of the invention as set forth except as indicated in the appended claims.

Having thus described my invention, what I claim and desire to protect by Letters Patent is:

1. In a device of the kind described in combination, means to support an article in a mold, a cylindrical roll of sheet metal constituting a mold provided with a longitudinal slit throughout and of a dimension to support the article supported and a clamp strip to cause said roll to contract or expand into and out of engagement with the article.

2. In a device of the kind described in combination, a mandrel adapted to support a rubber tube, a roll of sheet metal slit throughout its length to form a mold of a dimension to inclose the tube, and a pair of jaws adapted to encircle said roll to cause its contraction or expansion into and out of engagement with the tube.

3. Plastic molding apparatus comprising relatively rigid and resilient members for confining a vulcanizable mass therebetween during cure.

4. Plastic molding apparatus comprising relatively rigid and resilient members for confining a vulcanizable mass therebetween during cure, and means for holding the resilient member in operative forming relation with the rigid member.

5. Plastic molding apparatus comprising relatively rigid and resilient members in substantially concentric spaced relation for compactingly holding a vulcanizable rubber composition during cure.

6. Plastic molding apparatus comprising an internal rigid mandrel and an external constrictable metallic sheath.

7. Plastic molding apparatus comprising an internal rigid mandrel, an external constrictable and curvilinear metallic sheath adapted to receive the mandrel with a coating of vulcanizable composition thereon, and means for holding the sheath in constricting relation about the coating on the mandrel.

8. Plastic molding apparatus comprising an internal substantially rigid mandrel, and an external resilient sleeve in one piece and having overlapping longitudinal edges.

9. Plastic molding apparatus comprising an internal substantially rigid mandrel, an external resilient sleeve in one piece and having overlapping longitudinal edges, and means for bending the sleeve longitudinally to hold a vulcanizable mass on the mandrel under confinement during cure.

Signed at Union, county of Hudson and State of New Jersey, this 13th day of October, 1919.

ARTHUR J. BROWN.